(12) United States Patent
Tanaka et al.

(10) Patent No.: US 11,772,041 B2
(45) Date of Patent: Oct. 3, 2023

(54) COMPOSITE AMINE ABSORBENT, AND DEVICE AND METHOD FOR REMOVING CO2 OR H2S, OR BOTH OF CO2 AND H2S

(71) Applicants: MITSUBISHI HEAVY INDUSTRIES, LTD., Tokyo (JP); The Kansai Electric Power Co., Inc., Osaka (JP)

(72) Inventors: Hiroshi Tanaka, Tokyo (JP); Takuya Hirata, Tokyo (JP); Tatsuya Tsujiuchi, Tokyo (JP); Takashi Kamijo, Kanagawa (JP); Tomoki Noborisato, Kanagawa (JP)

(73) Assignees: MITSUBISHI HEAVY INDUSTRIES, LTD., Tokyo (JP); The Kansai Electric Power Co., Inc., Osaka (JP)

( * ) Notice: Subject to any disclaimer, the term of this patent is extended or adjusted under 35 U.S.C. 154(b) by 176 days.

(21) Appl. No.: 17/424,093

(22) PCT Filed: Dec. 4, 2019

(86) PCT No.: PCT/JP2019/047448
§ 371 (c)(1),
(2) Date: Jul. 19, 2021

(87) PCT Pub. No.: WO2020/153005
PCT Pub. Date: Jul. 30, 2020

(65) Prior Publication Data
US 2022/0096996 A1    Mar. 31, 2022

(30) Foreign Application Priority Data
Jan. 24, 2019   (JP) ................................ 2019-010194

(51) Int. Cl.
*B01D 53/14*   (2006.01)
*B01D 53/62*   (2006.01)
*B01D 53/96*   (2006.01)

(52) U.S. Cl.
CPC ..... *B01D 53/1468* (2013.01); *B01D 53/1475* (2013.01); *B01D 53/62* (2013.01);
(Continued)

(58) Field of Classification Search
CPC ....................... B01D 53/1468; B01D 53/1475; B01D 53/62; B01D 53/96; B01D 2252/20405;
(Continued)

(56) References Cited

U.S. PATENT DOCUMENTS

| 4,705,673 A | 11/1987 | Capobianco et al. |
| 8,147,593 B2 | 4/2012 | Mimura et al. |

(Continued)

FOREIGN PATENT DOCUMENTS

| EP | 2769759 A1 | 8/2014 |
| JP | H07-051537 A | 2/1995 |

(Continued)

OTHER PUBLICATIONS

Office Action issued in corresponding Russian Patent Application No. 2021121333, dated Mar. 23, 2022 (40 pages).
(Continued)

*Primary Examiner* — Anita Nassiri-Motlagh
(74) *Attorney, Agent, or Firm* — Osha Bergman Watanabe & Burton LLP (57) ABSTRACT

A composite amine absorbent according to the present invention is an absorbent for absorbing $CO_2$ or $H_2S$, or both of $CO_2$ and $H_2S$ in a gas. The absorbent is obtained by dissolving (1) a linear monoamine, (2) a diamine, and (3) propylene glycol alkyl ether, for example, represented by the following chemical formula (I) in water. In the composite amine absorbent, the components complexly interact, and the synergistic effect thereof provides good absorbability of $CO_2$ or $H_2S$, or both of $CO_2$ and $H_2S$ and good releasability of $CO_2$ or $H_2S$ absorbed during regeneration of the absor-
(Continued)

bent. Furthermore, the amount of water vapor in a reboiler 26 used during regeneration of the absorbent in a $CO_2$ recovery unit 12 can be reduced.

$$R^1\text{—O—}(R^2\text{—O})_n\text{—}R^3 \qquad (I)$$

20 Claims, 5 Drawing Sheets

(52) U.S. Cl.
CPC ...... B01D 53/96 (2013.01); *B01D 2252/2041* (2013.01); *B01D 2252/20405* (2013.01); *B01D 2257/304* (2013.01); *B01D 2257/504* (2013.01)

(58) Field of Classification Search
CPC ...... B01D 2252/2041; B01D 2257/304; B01D 2257/504
USPC ...................................................... 423/228
See application file for complete search history.

(56) References Cited

U.S. PATENT DOCUMENTS

| | | |
|---|---|---|
| 10,155,911 B2 | 12/2018 | Tan |
| 10,960,346 B2 | 3/2021 | Tanaka et al. |
| 2007/0148069 A1 | 6/2007 | Chakravarti et al. |
| 2008/0078292 A1 | 4/2008 | Mimura et al. |
| 2015/0290580 A1* | 10/2015 | Grandjean ......... B01D 53/1468 423/229 |
| 2016/0220947 A1 | 8/2016 | Tanaka et al. |
| 2017/0225118 A1* | 8/2017 | Kim .................. B01D 53/1493 |
| 2019/0151794 A1 | 5/2019 | Tanaka et al. |

FOREIGN PATENT DOCUMENTS

| | | |
|---|---|---|
| JP | 2009-521313 A | 6/2009 |
| JP | 2018-122242 A | 8/2018 |
| RU | 2586159 C1 | 6/2016 |
| WO | 2006/107026 A1 | 10/2006 |
| WO | 2011/018479 A1 | 2/2011 |
| WO | 2015/066807 A1 | 5/2015 |

OTHER PUBLICATIONS

"Structure of molecules", Basics of Biochemistry, General Chemistry, 14-15; Published in Wayback Internet Archive Machine on Jan. 17, 2017; Internet source: http://www.chem.msu.ru/rus/teaching/kolman/14.htm (4 pages).

Examination Report issued in corresponding Indian Patent Application No. 202117032519, dated Oct. 28, 2021 (5 pages).

Extended European Search Report issued in European Application No. 19911335.8, dated Dec. 15, 2021 (8 pages).

* cited by examiner

COMPOSITE AMINE ABSORBENT, AND DEVICE AND METHOD FOR REMOVING CO2 OR H2S, OR BOTH OF CO2 AND H2S

FIELD

The present invention relates to a composite amine absorbent, and a method and a device for removing $CO_2$ or $H_2S$, or both of $CO_2$ and $H_2S$.

As one of causes of a global warming phenomenon, a greenhouse effect due to $CO_2$ has been recently pointed out, and it is imperative to make an international countermeasure for protection of the global environment. Sources of $CO_2$ range all fields of human activity that combust fossil fuels, and a demand for suppressing $CO_2$ emissions tends to further increase. To meet the demand, a method for removing and recovering $CO_2$ in a flue gas from a boiler by bringing the flue gas into contact with an amine-based $CO_2$ absorbent and a method for storing recovered $CO_2$ without releasing the $CO_2$ to the atmosphere are actively researched for power generation facilities such as a thermal power station in which a large amount of fossil fuel is used. As a step of removing and recovering $CO_2$ from a flue gas using a $CO_2$ absorbent as described above, a step is employed in which the flue gas is brought into contact with the $CO_2$ absorbent in an absorber, the absorbent containing absorbed $CO_2$ is heated in a regenerator, to release the $CO_2$ and regenerate the absorbent, and the absorbent is recirculated into the absorber for reuse (for example, see Patent Literature 1).

As a technology for recovering $CO_2$ from a flue gas, for example, a chemical absorption method in which $CO_2$ is chemically absorbed and separated by using a chemical absorbent such as an amine solution, a physical absorption method in which $CO_2$ is absorbed by a physical absorbent under a higher pressure, and separated, and the like have been proposed. A chemical absorption method using a chemical absorbent such as an amine solution that strongly binds to $CO_2$ by a chemical reaction is applied to a low partial pressure $CO_2$ (e.g., 0.003 to 0.014 MPa) of a flue gas or the like since the chemical absorbent has high reactivity. However, a high energy is required to release $CO_2$ from the absorbent chemically strongly bound and regenerate a $CO_2$ absorbent. In a physical absorption method in which $CO_2$ is separated by using a physical dissolution phenomenon, a consumption energy for regeneration of $CO_2$ is low, but high partial pressure $CO_2$ (e.g., 0.9 to 2.0 MPa) is required. For example, the physical absorption method is suitable for separation of $CO_2$ in an integrated coal gasification combined cycle (IGCC) and the like, but it is unsuitable for a flue gas having a low $CO_2$ partial pressure.

In a method for absorbing, removing, and recovering $CO_2$ from a $CO_2$-containing gas such as a flue gas from a power station using the $CO_2$ absorbent of the chemical absorption method, the step is additionally installed in a combustion facility. Therefore, it is necessary to reduce the operation cost as much as possible. Particularly, in the step, a step of releasing $CO_2$ from the $CO_2$ absorbent after absorption of $CO_2$ and regenerating the $CO_2$ consumes a large amount of heat energy (steam). Therefore, it is necessary to provide an energy-saving process as much as possible.

As the $CO_2$ absorbent used in the physical absorption method, for example, an absorbent using polyethylene glycol monoalkyl ether has been proposed (for example, see Patent Literature 2). As the $CO_2$ absorbent used in the chemical absorption method, for example, an absorbent using polypropylene glycol ether has been proposed (for example, see Patent Literature 3).

CITATION LIST

Patent Literature

Patent Literature 1: Japanese Patent Application Laid-open No. H7-51537
Patent Literature 2: U.S. Pat. No. 4,705,673
Patent Literature 3: Japanese Patent Application Publication No. 2009-521313

SUMMARY

Technical Problem

However, the $CO_2$ absorbent disclosed in Patent Literature 2 is an absorbent for a physical absorption method under a high $CO_2$ partial pressure. Therefore, the $CO_2$ absorbent has a problem of the low reduction percentage of reboiler duty in a regenerator when the $CO_2$ partial pressure is low as is the case with the chemical absorption method. As the $CO_2$ absorbent disclosed in Patent Literature 3, propylene glycol methyl ether is exemplified. The propylene glycol methyl ether has a low boiling point under the atmospheric pressure. During a $CO_2$ absorption step in the $CO_2$ absorber, release of the propylene glycol methyl ether outside the system, and the like are caused along with gas emissions due to vaporization, and problems about operability and performance improvement.

Therefore, to achieve energy saving by using a small amount of steam while a desired amount of $CO_2$ recovery can be achieved, development of a novel composite amine absorbent having not only an absorption capacity but also a regeneration capacity is desired for reduction of operation cost for recovery of $CO_2$ in regeneration of the $CO_2$ absorbent during recovery of $CO_2$ from a flue gas by the chemical absorption method.

The present invention has been made in view of the aforementioned problems, and an object of the present invention is to provide a composite amine absorbent having not only absorption capacity but also regeneration capacity, and device and method for removing $CO_2$ or $H_2S$, or both of $CO_2$ and $H_2S$.

Solution to Problem

To solve the aforementioned problems, a first invention according to the present invention is a composite amine absorbent for absorbing $CO_2$ or $H_2S$, or both of $CO_2$ and $H_2S$ in a gas. The composite amine absorbent being obtained by dissolving (1) a linear monoamine, (2) a diamine, and (3) a first ether bond-containing compound of following chemical formula (I) in water:

$$R^1-O-(R^2-O)_n-R^3 \qquad (I)$$

wherein $R^1$ is a hydrocarbon group having 2 to 4 carbon atoms, $R^2$ is a propylene group, $R^3$ is hydrogen, and n is 1 to 3.

In a second invention according to the first invention, the first ether bond-containing compound (3) of the chemical formula (I) is propylene glycol alkyl ether, and alkyl ether in the propylene glycol alkyl ether is any of ethyl ether, propyl ether, and butyl ether.

A third invention is a composite amine absorbent for absorbing $CO_2$ or $H_2S$, or both of $CO_2$ and $H_2S$ in a gas. The composite amine absorbent being obtained by dissolving (1) a linear monoamine, (2) a diamine, and (4) a second ether bond-containing compound of following chemical formula (II) in water:

$$R^4-O-(R^5-O)_n-R^6 \qquad (II)$$

wherein $R^4$ is an acetyl group, $R^5$ is an ethylene group, $R^6$ is an alkyl group, and n is 1.

In a fourth invention according to the third invention, the second ether bond-containing compound (4) of the chemical formula (II) is ethylene glycol alkyl ether acetate, and alkyl ether in the ethylene glycol alkyl ether acetate is any of methyl ether and ethyl ether.

In a fifth invention according to the first or third invention, the linear monoamine (1) includes at least one of a primary linear monoamine, a secondary linear monoamine, and a tertiary linear monoamine.

In a sixth invention according to the first or third invention, the diamine (2) includes at least one of a primary linear polyamine, a secondary linear polyamine, and a cyclic polyamine.

In a seventh invention according to the first or third invention, a total concentration of the linear monoamine (1) and the diamine (2) is 40 to 60% by weight based on the total weight of the absorbent.

In an eighth invention according to the first invention, a mixing ratio ((diamine+first ether bond-containing compound)/linear monoamine) of the diamine (2) and the first ether bond-containing compound (3) to the linear monoamine (1) is 0.35 to 1.1.

In a ninth invention according to the first invention, a weight ratio of the first ether bond-containing compound to the diamine as a mixing ratio of the diamine (2) and the first ether bond-containing compound (3) is 0.99 to 7.8.

In a tenth invention according to the third invention, a mixing ratio ((diamine+ether bond-containing compound)/linear monoamine) of the diamine (2) and the second ether bond-containing compound (4) to the linear monoamine (1) is 0.35 to 1.1.

In an eleventh invention according to the third invention, a weight ratio of the ether bond-containing compound to the diamine as a mixing ratio of the diamine (2) and the second ether bond-containing compound (4) is 0.99 to 7.8.

A twelfth invention is a device for removing $CO_2$ or $H_2S$, or both of $CO_2$ and $H_2S$. The device includes an absorber that brings a gas containing $CO_2$ or $H_2S$, or both of $CO_2$ and $H_2S$ into contact with an absorbent to remove $CO_2$ or $H_2S$, or both of $CO_2$ and $H_2S$; and an absorbent regenerator that regenerates a solution in which $CO_2$ or $H_2S$, or both of $CO_2$ and $H_2S$ have been adsorbed, a solution regenerated by removing $CO_2$ or $H_2S$, or both of $CO_2$ and $H_2S$ in the absorbent regenerator being reused in the absorber. The device uses the composite amine absorbent according to any one of claims 1 to 11.

In a thirteenth invention according to the twelfth invention, an absorption temperature of the absorber is 30 to 80° C., and a regeneration temperature of the absorbent regenerator is 110° C. or higher.

In a fourteenth invention according to the twelfth or thirteenth invention, a $CO_2$ partial pressure at an inlet of the absorber is low.

A fifteenth invention is a method for removing $CO_2$ or $H_2S$, or both of $CO_2$ and $H_2S$. The method includes bringing a gas containing $CO_2$ or $H_2S$, or both of $CO_2$ and $H_2S$ into contact with an absorbent to remove $CO_2$ or $H_2S$, or both of $CO_2$ and $H_2S$ in an absorber; regenerating a solution in which $CO_2$ or $H_2S$, or both of $CO_2$ and $H_2S$ have been absorbed in an absorbent regenerator; and reusing a solution regenerated by removing $CO_2$ or $H_2S$, or both of $CO_2$ and $H_2S$ in the absorbent regenerator in the absorber, wherein the composite amine absorbent according to any one of the first to eleventh inventions is used to remove $CO_2$ or $H_2S$, or both of $CO_2$ and $H_2S$.

In a sixteenth invention according to the fifteenth invention, an absorption temperature of the absorber is 30 to 80° C., and a regeneration temperature of the absorbent regenerator is 110° C. or higher.

In a seventeenth invention according to the fifteenth or sixteenth invention, a $CO_2$ partial pressure at an inlet of the absorber is low.

Advantageous Effects of Invention

In the present invention, an absorbent is obtained by dissolving (1) a linear monoamine, (2) a diamine, and (3) an ether bond-containing compound ether of the aforementioned formula (I) in water. Therefore, the components complexly interact with each other, and the synergistic effect thereof provides good absorbability of $CO_2$ or $H_2S$, or both of $CO_2$ and $H_2S$, and good releasability of absorbed $CO_2$ or $H_2S$ during regeneration of the absorbent. Furthermore, the amount of steam used in regeneration of the absorbent in a $CO_2$ recovery facility can be reduced.

DESCRIPTION OF EMBODIMENTS

Hereinafter, preferred examples of the present invention will be described in detail with reference to the accompanying drawings. The present invention is not limited by the examples. When there are a plurality of examples, the present invention includes a combination of the examples.

EXAMPLES

A composite amine absorbent according to an example of the present invention is an absorbent that absorbs $CO_2$ or $H_2S$, or both of $CO_2$ and $H_2S$ in a gas. The absorbent is obtained by dissolving (1) a linear monoamine (component a), (2) a diamine (component b), and (3) a first ether bond-containing compound ether of the following chemical formula (I) (component c) that is an absorbent for a chemical absorption method in water (component d). In the present invention, the absorbent is obtained by dissolving the linear monoamine (1), the diamine (2), and the first ether bond-containing compound ether (3) in water. Therefore, the components complexly interact, and the synergistic effect thereof provides good absorbability of $CO_2$ or $H_2S$, or both of $CO_2$ and $H_2S$, and good releasability of absorbed $CO_2$ or $H_2S$ during regeneration of the absorbent. Furthermore, the amount of steam used in regeneration of the absorbent in a $CO_2$ recovery facility can be reduced.

Herein, the linear monoamine (1) (component a) includes at least one of a primary linear monoamine (component a1), a secondary linear monoamine (component a2), and a tertiary linear monoamine (component a3). The linear monoamine may be a combination of two components of linear amines including a primary linear monoamine and a secondary linear monoamine, a combination of two components of linear amines including a primary linear monoamine and a tertiary linear monoamine, or a combination of three components of linear amines including a primary linear monoamine, a secondary linear monoamine, and a tertiary linear monoamine.

The primary linear monoamine (component a1) is preferably a primary monoamine with a low steric hindrance (component a1L) or a primary monoamine with a high steric hindrance (component a1H).

The primary monoamine with a low steric hindrance (component a1L) in the primary linear monoamine may be at least one selected from monoethanolamine (MEA), 3-amino-1-propanol, 4-amino-1-butanol, and diglycolamine. The compounds may be combined.

The primary monoamine with a high steric hindrance (component a1H) in the primary linear monoamine is preferably a compound represented by a chemical formula (1), which is illustrated in "Formula 1" below.

(1)

$R_{11}$ to $R_{13}$: H or hydrocarbon group having 1 to 3 carbon atoms

Specific examples of the primary monoamine with a high steric hindrance (component a1H) include a compound separated from at least one of 2-amino-1-propanol (2A1P), 2-amino-1-butanol (2A1B), 2-amino-3-methyl-1-butanol (AMB), 1-amino-2-propanol (1A2P), 1-amino-2-butanol (1A2B), and 2-amino-2-methyl-1-propanol (AMP), but the present invention is not limited to the specific examples. The compounds may be combined.

The secondary linear monoamine (a2) is preferably a compound represented by a chemical formula (2), which illustrated in "Formula 2" below.

(2)

$R_{14}$: Linear hydrocarbon group having 1 to 4 carbon atoms $R_{15}$: Hydroxyalkyl group having 1 to 4 carbon atoms Specific examples of the secondary linear monoamine (2a) include a compound selected from at least one of N-methylaminoethanol, N-ethylaminoethanol, N-propylaminoethanol, and N-butylaminoaethanol, but the present invention is not limited to the specific examples. The compounds may be combined.

The tertiary linear monoamine (a3) is preferably a compound represented by a chemical formula (3), which is illustrated in "Formula 3" below.

(3)

$R_{16}$: Hydrocarbon group having 1 to 4 carbon atoms $R_{17}$: Hydroxyalkyl group having 1 to 4 carbon atoms, hydroxyalkyl group $R_{18}$: Hydroxyalkyl group having 1 to 4 carbon atoms, hydroxyalkyl group Specific examples of the tertiary linear monoamine (a3) include a compound selected from at least one of N-methyldiethanolamine, N-ethyldiethanolamine, N-butyldiethanolamine, 4-dimethylamino-1-butanol, 2-dimethylaminoethanol, 2-diethylaminoethanol, 2-di-n-butylaminoethanol, N-ethyl-N-methylethanolamine, 3-dimethylamino-1-propanol, and 2-dimethylamino-2-methyl-1-propanol, but the present invention is not limited to the specific examples. The compounds may be combined.

The aforementioned two-component based mixing of the linear monoamines is preferably as follows. The weight ratio (a1H)/(a1L) of the primary linear monoamine with a high steric hindrance (component a1H) to the primary linear monoamine with a low steric hindrance (component a1L) preferably falls within a range of 0.3 to 2.5, more preferably a range of 0.3 to 1.2, and further preferably a range of 0.3 to 0.7. This is because the absorption performance at a weight ratio other than the aforementioned weight ratios is lower than the absorption performance as a reference at a monoethanolamine (MEA) concentration of 30% by weight, which has been generally used.

The weight ratio (a3)/(a2) of the tertiary linear monoamine (component a3) to the secondary linear monoamine (component a2) preferably falls within a range of 0.3 to 2.5, more preferably a range of 0.6 to 1.7, and further preferably a range of 0.6 to 1.0. When the weight ratio is lower than the aforementioned range, the regeneration performance is reduced. When it is higher than the aforementioned range, the absorption performance is deteriorated.

The weight ratio (a1H)/(a2) of the primary linear monoamine with a high steric hindrance (component a1H) to the secondary linear monoamine (component a2) preferably falls within a range of 0.3 to 2.5, more preferably a range of 0.6 to 1.7, and further preferably a range of 0.6 to 1.0. When the weight ratio is lower than the aforementioned range, the regeneration performance is reduced. When it is higher than the aforementioned range, the absorption performance is deteriorated.

The weight ratio (a1H)/(a3) of the primary linear monoamine with a high steric hindrance (component a1H) to the tertiary linear monoamine (component a3) preferably falls within a range of 0.3 to 2.5, more preferably a range of 0.6 to 1.7, and further preferably a range of 0.6 to 1.0. When the weight ratio is lower than the aforementioned range, the absorption performance is reduced. When it is higher than the aforementioned range, the regeneration performance is also deteriorated.

The diamine (2) (component b) preferably includes at least one of a primary linear polyamine, a secondary linear polyamine, and a cyclic polyamine.

Examples of group of a primary linear polyamine or a secondary linear polyamine include a compound selected from at least one of ethylenediamine (EDA), N,N'-dimethylethylenediamine (DMEDA), N,N'-diethylethylenediamine (DEEDA), propanediamine (PDA), and N,N'-dimethylpropanediamine (DMPDA), but the present invention is not limited to the examples. The compounds may be combined.

Examples of the cyclic polyamine include a compound selected from at least one of piperazine (PZ), 1-methylpiperazine (1MPZ), 2-methylpiperazine (1MPZ), 2,5-dimethylpiperazine (DMPZ), 1-(2-aminoethyl)piperazine (AE-PRZ), and 1-(2-hydroxyethyl)piperazine (HEP), but the present invention is not limited to the examples. The compounds may be combined.

Examples of the first ether bond-containing compound ether (3) (component c) include a first ether bond-containing compound of the following chemical formula (I).

$$R^1-O-(R^2-O)_n-R^3 \quad (I)$$

In the formula (I), R is a hydrocarbon group having 2 to 4 carbon atoms, $R^2$ is a propylene group, $R^3$ is hydrogen, and n is 1 to 3.

The first ether bond-containing compound (3) of the chemical formula (I) is a propylene glycol alkyl ether, and preferably any of propylene glycol ethyl ether, propylene glycol propyl ether, and propylene glycol butyl ether in which alkyl ether in the propylene glycol alkyl ether is ethyl ether, propyl ether, or butyl ether. When propylene glycol methyl ether in which alkyl ether in the propylene glycol alkyl ether is methyl ether is mixed, the boiling point under atmospheric pressure is as low as 120° C. During absorption of $CO_2$, release of the ether bond-containing compound outside a system, and the like are caused along with gas emissions due to vaporization. Thus, problems about operability and performance improvement.

Herein, the boiling point of propylene glycol ethyl ether as the first ether bond-containing compound (3) of the chemical formula (I) is 132° C., the boiling point of propylene glycol propyl ether is 149° C., the boiling point of propylene glycol butyl ether is 170° C., the boiling point of dipropylene glycol propyl ether is 212° C., and the boiling point of tripropylene glycol butyl ether is 275° C. Therefore, the problems as described above when propylene glycol methyl ether having a low boiling point is mixed do not arise.

In the present invention, (4) a second ether bond-containing compound of the following chemical formula (II) may be mixed instead of the first ether bond-containing compound of the chemical formula (I) as the ether bond-containing compound ether (3).

$$R^4-O-(R^5-O)_n-R^6 \quad (II)$$

In the formula (I), $R^4$ is an acetyl group, $R^5$ is an ethylene group, $R^6$ is an alkyl group, and n is 1.

The second ether bond-containing compound (4) of the chemical formula (II) is an ethylene glycol alkyl ether acetate, and preferably any of ethylene glycol methyl ether acetate and ethylene glycol ethyl ether acetate in which the alkyl ether in the ethylene glycol alkyl ether acetate is methyl ether or ethyl ether. This is because when ethylene glycol propyl ether acetate and ethylene glycol butyl ether acetate that have an alkyl group having 3 (C3) or more carbon atoms (e.g., propyl ether and butyl ether) are used, the dissolution is deteriorated, and good miscibility is not achieved.

Next, it is preferable that the mixing ratio of the components (components a, b, and c) be defined as follows. The total concentration of the linear monoamine (1) (component a) and the diamine (2) (component b) is preferably 40 to 60% by weight based on the total weight of the absorbent, and further preferably 47 to 55% by weight based on the total weight of the absorbent. When the total concentration is outside the aforementioned range, the composite amine absorbent does not favorably function as an absorbent.

The mixing ratio (b+c)/a of the diamine (2) (component b) and the first ether bond-containing compound (3) (component c) to the linear monoamine (1) (component a) is preferably 0.35 to 1.1, and further preferably 0.40 to 0.94.

In mixing of the second ether bond-containing compound (4), the mixing ratio (b+c)/a of the diamine (2) (component b) and the second ether bond-containing compound (4) (component c) to the linear monoamine (1) (component a) is also preferably 0.35 to 1.1, and further preferably 0.40 to 0.94.

Figure 5:
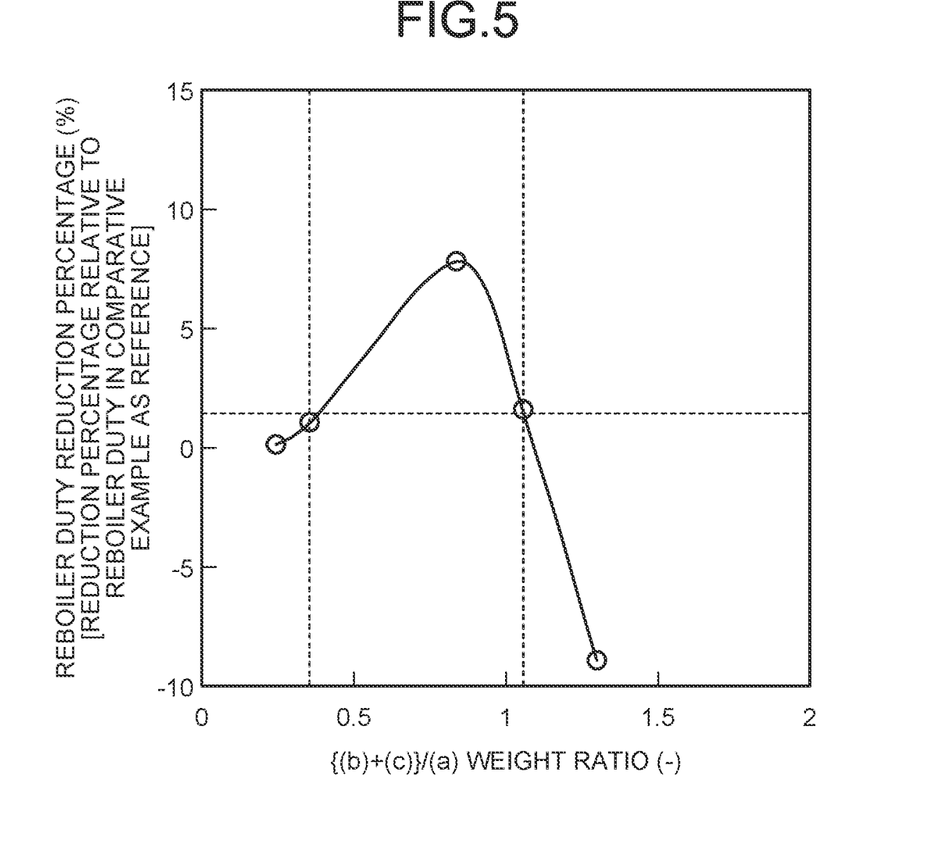
FIG. 5 is a graph illustrating a relation between a weight ratio ((b+c)/a) of an absorbent composition and a reboiler duty reduction percentage (%).

FIG. 5 is a graph illustrating a relation between a composition weight ratio ((b+c)/a) in the absorbent and a reboiler duty reduction percentage (%). As illustrated in FIG. 5, under a mixing condition of a low concentration in which (b+c)/a in mixing is less than 0.35, the reboiler duty reduction effect is restricted, and under a mixing condition of a high concentration in which (b+c)/a is more than 1.1, the reboiler reduction percentage is abruptly decreased due to an increase in liquid viscosity and the like. Thus, the conditions are not efficient in terms of practical use.

As the mixing ratio of the diamine (2) (component b) and the ether bond-containing compound (3) (component c), the weight ratio of the ether bond-containing compound (component c) to the diamine (component b) is preferably 0.99 to 7.8. As the mixing ratio of the diamine (2) (component b) and the ether bond-containing compound (4) (component c), the weight ratio of the ether bond-containing compound (component c) to the diamine (component b) is preferably 0.99 to 7.8 also in a case of mixing of the second ether bond-containing compound. Under a low-ratio condition of this mixing ratio, the reboiler duty reduction effect is restricted, and under a high-ratio condition, the ratio is not efficient in terms of practical use such as an increase in liquid viscosity.

The mixing percentage (% by weight) of moisture content (component d) is the weight percentage of water as the rest of the absorbent other than the total concentration of the linear monoamine (1) and the diamine (2) and the ether compound added.

In the present invention, for example, it is preferable that the absorption temperature in an absorber for a chemical absorption method during contact with a flue gas containing $CO_2$ or the like generally fall within a range of 30 to 80° C. To the absorbent used in the present invention, a corrosion inhibitor, a deterioration inhibitor, or the like is added, if necessary.

It is preferable that the $CO_2$ partial pressure at an inlet of the $CO_2$ absorber during absorption of $CO_2$ in a gas to be treated be low $CO_2$ partial pressure (e.g., 0.003 to 0.1 MPa) in terms of application of the chemical absorption method.

In the present invention, when the pressure in a regenerator is 130 to 200 kPa (absolute pressure), for the regeneration temperature at the regenerator that releases $CO_2$ or the like from the absorbent in which $CO_2$ or the like has been absorbed, the regenerator bottom temperature of the absorbent regenerator is preferably 110° C. or higher. This is because it is necessary to increase the amount of absorbent circulated in a system during regeneration at lower than 110° C., and the regeneration is not preferred in terms of regeneration efficiency. Regeneration at 115° C. or higher is more preferred.

Examples of a gas to be treated in the present invention include, but not limited to, a coal gasified gas, a synthesis gas, a coke-oven gas, a petroleum gas, and a natural gas. Any gas may be used as long as it contains a gas containing an acid gas such as $CO_2$ or $H_2S$.

A process that can be employed in a method for removing $CO_2$ or $H_2S$, or both of $CO_2$ and $H_2S$ in a gas of the present invention is not particularly limited, and an example of a removal device that removes $CO_2$ will be described with reference to FIG. 1.

Figure 1:
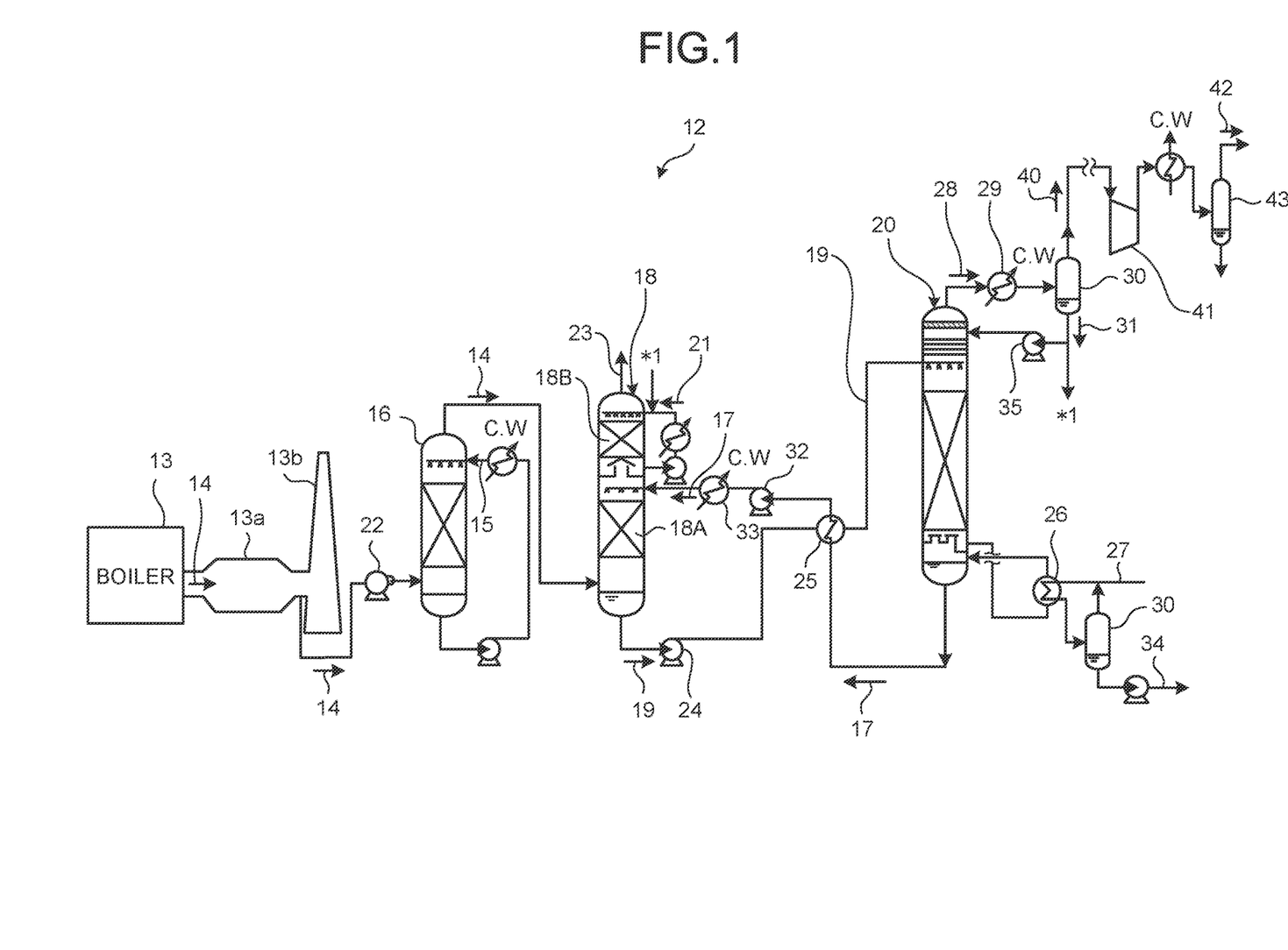
FIG. 1 is a schematic view illustrating a configuration of a $CO_2$ recovery unit according to Example 1.

FIG. 1 is a schematic diagram illustrating a configuration of a $CO_2$ recovery unit according to Example 1. As illustrated in FIG. 1, a $CO_2$ recovery unit 12 according to Example 1 has a flue gas cooling device 16 that cools a flue gas 14 containing $CO_2$ and $O_2$ that is discharged from an industrial combustion facility 13 such as a boiler or a turbine using cooling water 15, a $CO_2$ absorber 18 having a $CO_2$ recovery portion 18A that brings the cooled flue gas 14 containing $CO_2$ into contact with a $CO_2$ absorbent (hereinafter sometimes referred to as "absorbent") 17 that absorbs $CO_2$ to remove $CO_2$ from the flue gas 14, and an absorbent regenerator 20 that releases $CO_2$ from a $CO_2$ absorbent (hereinafter sometimes referred to as "rich solution") 19 in which $CO_2$ has been absorbed and regenerates the $CO_2$ absorbent. In the $CO_2$ recovery unit 12, the regenerated $CO_2$ absorbent (hereinafter sometimes referred to as "lean solution") 17 in which $CO_2$ has been removed in the absorbent regenerator 20 is reused as a $CO_2$ absorbent in the $CO_2$ absorber 18.

In FIG. 1, a reference symbol 13a is a flue gas duct, a reference symbol 13b is a stack, and a reference symbol 34 is steam-condensed water. The $CO_2$ recovery unit 12 may be retrofitted to recover $CO_2$ from an existing flue gas source or may be installed together with a new flue gas source. An openable and closable damper is installed in a line of the flue gas 14, and the damper is opened during operation of the $CO_2$ recovery unit 12. The damper is set to be closed when a flue gas source is in operation but the operation of the $CO_2$ recovery unit 12 is stopped.

In a method for recovering $CO_2$ using this $CO_2$ recovery unit 12, the flue gas 14 from the industrial combustion facility 13 such as a boiler or a gas turbine containing $CO_2$ is pressurized by a flue gas blower 22, sent to the flue gas cooling device 16, cooled at the flue gas cooling device 16 by the cooling water 15, and sent to the $CO_2$ absorber 18.

In the $CO_2$ absorber 18, the flue gas 14 comes into countercurrent contact with the $CO_2$ absorbent 17 that is the amine absorbent according to this example, and $CO_2$ in the flue gas 14 is absorbed into the $CO_2$ absorbent 17 by a chemical reaction. A $CO_2$-removed flue gas in which $CO_2$ has been removed in the $CO_2$ recovery portion 18A comes into gas-liquid contact with circulating cleaning water 21 containing a $CO_2$ absorbent that is supplied from a nozzle in a water-cleaning portion 18B in the $CO_2$ absorber 18, the $CO_2$ absorbent 17 entrained with the $CO_2$-removed flue gas is recovered, and a flue gas 23 in which $CO_2$ has been removed is then discharged outside the system. The rich solution 19 that is the $CO_2$ absorbent in which $CO_2$ has been absorbed is pressurized by a rich solution pump 24, heated by the lean solution that is the $CO_2$ absorbent 17 regenerated in the absorbent regenerator 20 in a rich-lean solution heat exchanger 25, and supplied to the absorbent regenerator 20.

The rich solution 19 released from an upper portion of the absorbent regenerator 20 to the inside thereof causes an endothermic reaction using steam that is supplied from the bottom portion, and most of $CO_2$ is released. The $CO_2$ absorbent in which a part or most of $CO_2$ has been released in the absorbent regenerator 20 is referred to as semi-lean solution. This semi-lean solution becomes the $CO_2$ absorbent (lean solution) 17 in which almost all of $CO_2$ has been removed when the solution reaches the bottom portion of the absorbent regenerator 20. A part of this lean solution 17 is overheated by steam 27 in a reboiler 26, and steam for $CO_2$ detachment is supplied to the inside of the absorbent regenerator 20.

On the other hand, from the top portion of the absorbent regenerator 20, a $CO_2$ entraining gas 28 with steam released from the rich solution 19 and the semi-lean solution in the regenerator is delivered, the steam is condensed using a condenser 29, water is separated in a separation drum 30, and a $CO_2$ gas 40 is released outside the system, compressed by a separate compressor 41, and recovered. A $CO_2$ gas 42 that has been compressed and recovered passes through a separation drum 43, and is injected into an oilfield using enhanced oil recovery (EOR), or retained in an aquifer to make a global warming countermeasure. Reflux water 31 separated and refluxed from the $CO_2$ accompanying gas 28 with water vapor in the separation drum 30 is supplied to the upper portion and a cleaning water 21 side of the absorbent regenerator 20 by a reflux water circulation pump 35. The regenerated $CO_2$ absorbent (lean solution) 17 is cooled using the rich solution 19 in the rich-lean solution heat exchanger 25, then pressurized by a lean solution pump 32, cooled using a lean solution cooler 33, and then supplied to the inside of the $CO_2$ absorber 18. In this embodiment, the outline thereof is only described, and some of accompanying devices are omitted.

Hereinafter, preferred test examples exhibiting the effects of the present invention will be described, but the present invention is not limited to the test examples.

Figure 2:
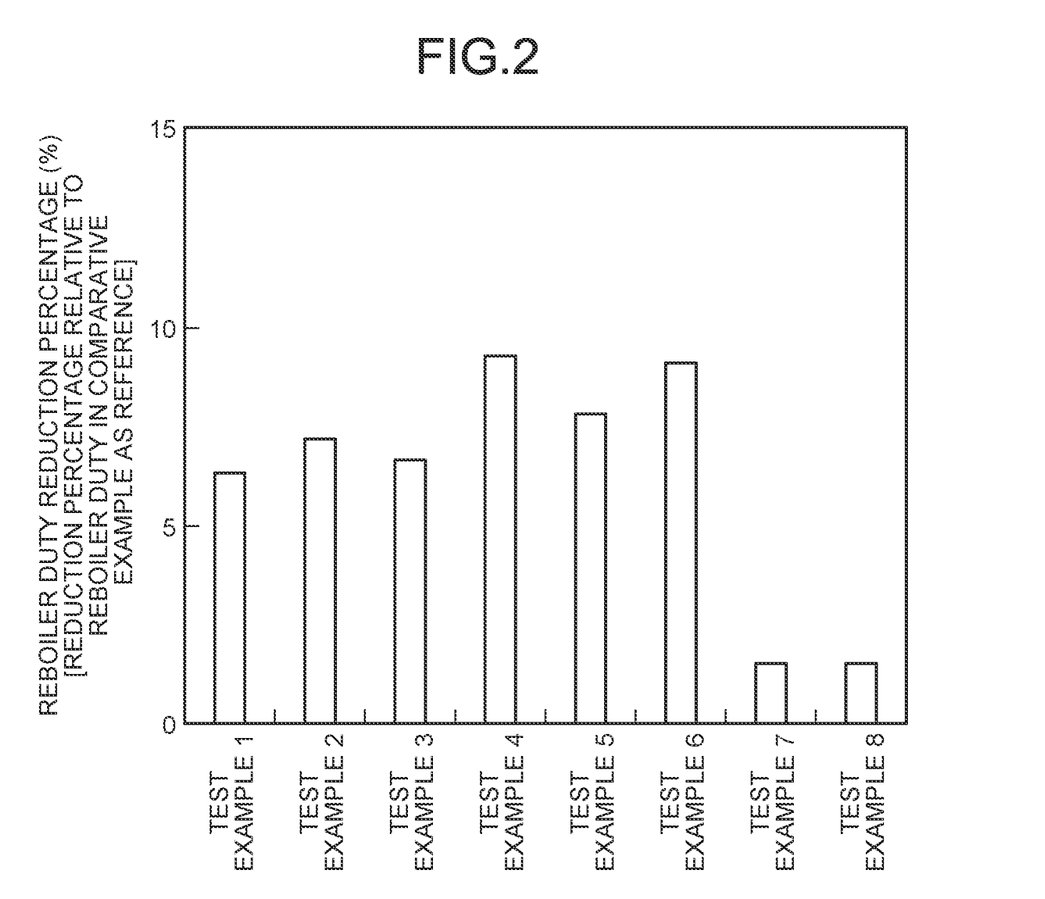
FIG. 2 is a graph illustrating reboiler duty reduction percentages according to Test Examples 1 to 8.
Figure 3:
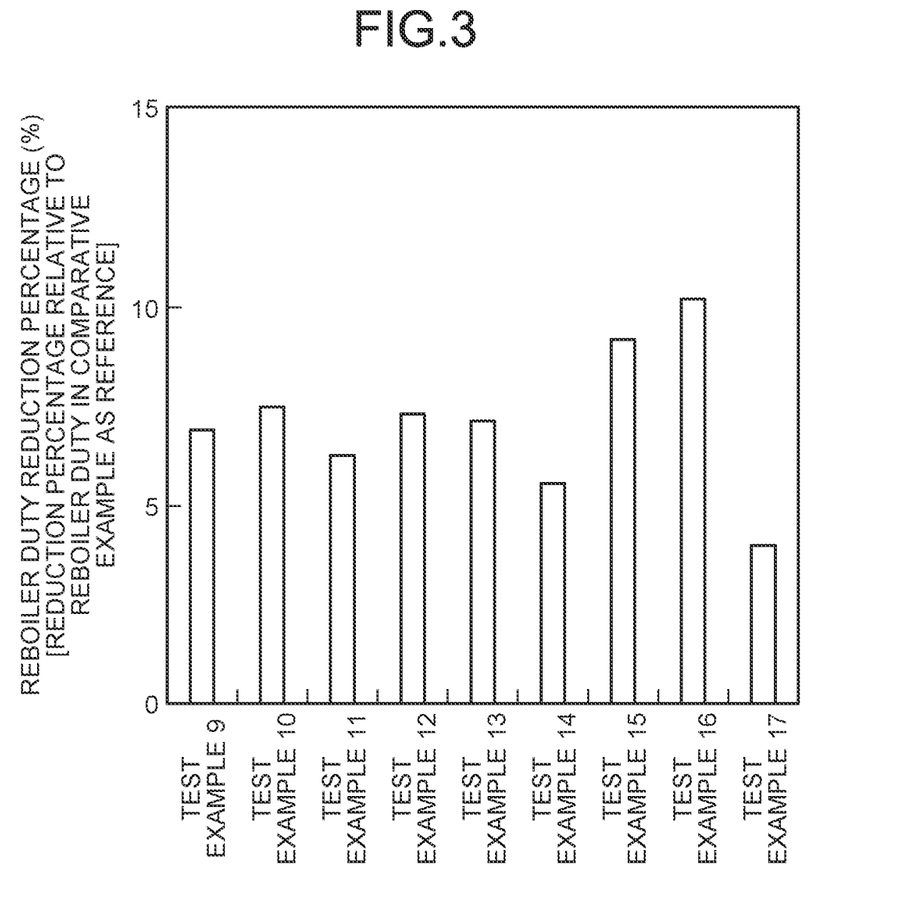
FIG. 3 is a graph illustrating reboiler duty reduction percentages according to Test Examples 9 to 17.
Figure 4:
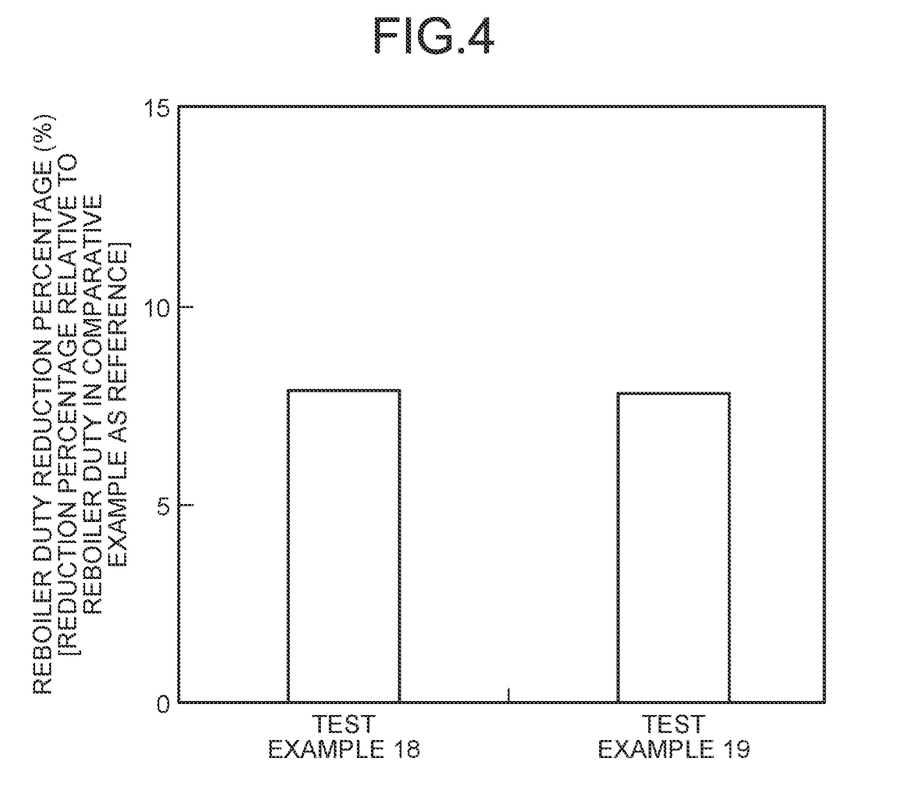
FIG. 4 is a graph illustrating reboiler duty reduction percentages according to Test Examples 18 and 19.

TEST EXAMPLES $CO_2$ was absorbed using an absorption test device not illustrated. FIGS. 2 to 3 are graphs illustrating reboiler duty reduction percentages of three-component-based composite amine absorbents (a linear monoamine (component a), a diamine (component b), and a first ether bond-containing compound (component c) are dissolved in water (component d)) in Test Examples 1 to 17. FIG. 4 is a graph illustrating reboiler duty reduction percentages of three-component-based composite amine absorbents (a linear monoamine (component a), a diamine (component b), and a second ether bond-containing compound (component c) are dissolved in water (component d)) in Test Examples 18 and 19. In Comparative Examples, the reboiler duties are determined under the same condition as those in Test Examples except that the first ether bond-containing compound or the second ether bond-containing compound (component c) is excluded from compositions of Test Examples, and the reboiler duty reduction percentages (%) are each determined using the reboiler duties of these Comparative Examples as references. The list of components of Test Examples is listed below (Table 1).

TABLE 1

| Test Ex. | (a) Linear monoamine | (b) Diamine | (c) Ether bond-containing compound | | | | (d) Water concentration (% by weight) |
|---|---|---|---|---|---|---|---|
| | | | Component | Weight ratio [(b) + (c)]/(a) | Weight ratio (c)/(b) | | |
| 1 | N-ethyl-aminoethanol | — | 2-Methyl-piperazine | Propylene glycol monopropyl ether | 0.53 to 0.94 | 1.2 to 7.8 | 22 to 45 |
| 2 | N-ethyl-aminoethanol | — | Piperazine | Propylene glycol monopropyl ether | | | |
| 3 | N-butyl-aminoethanol | — | 2-Methyl-piperazine | Propylene glycol monopropyl ether | | | |
| 4 | N-butyl-aminoethanol | — | Piperazine | Propylene glycol monopropyl ether | | | |
| 5 | Mono-ethanolamine | 2-Amino-2-methyl-1-propanol | Piperazine | Propylene glycol monopropyl ether | 0.84 | | |
| 6 | Mono-ethanolamine | 2-Amino-2-methyl-1-propanol | Propane-diamine | Propylene glycol monopropyl ether | | | |
| 7 | Mono-ethanolamine | 2-Amino-2-methyl-1-propanol | Piperazine | Dipropylene glycol monopropyl ether | 0.40 | | |
| 8 | Mono-ethanolamine | 2-Amino-2-methyl-1-propanol | Piperazine | Propylene glycol monopropyl ether | 0.35 to 1.1 | 0.99 to 5.0 | 17 to 46 |
| 9 | N-ethyl-aminoethanol | 2-Amino-2-methyl-1-propanol | Piperazine | Propylene glycol monopropyl ether | 0.61 | 1.2 to 7.8 | 22 to 45 |
| 10 | N-butyl-aminoethanol | 2-Amino-2-methyl-1-propanol | Piperazine | Propylene glycol monopropyl ether | | | |
| 11 | N-methyl-diethanolamine | 2-Amino-2-methyl-1-propanol | Piperazine | Propylene glycol monopropyl ether | | | |
| 12 | N-methyl-diethanolamine | N-ethyl-aminoethanol | Piperazine | Propylene glycol monopropyl ether | | | |
| 13 | N-methyl-diethanolamine | N-butyl-aminoethanol | Piperazine | Propylene glycol monopropyl ether | | | |
| 14 | N-ethyl-diethanolamine | 2-Amino-2-methyl-1-propanol | Piperazine | Propylene glycol monopropyl ether | | | |
| 15 | N-ethyl-diethanolamine | N-ethyl-aminoethanol | Piperazine | Propylene glycol monopropyl ether | | | |
| 16 | N-ethyl-diethanolamine | N-butyl-aminoethanol | Piperazine | Propylene glycol monopropyl ether | | | |
| 17 | 4-dimethyl-amino-1-butanol | 2-Amino-2-methyl-1-propanol | Piperazine | Propylene glycol monopropyl ether | | | |
| 18 | Mono-ethanolamine | 2-Amino-2-methyl-1-propanol | Piperazine | Ethylene glycol monoethyl ether acetate | 0.84 | | |

TABLE 1-continued

| Test Ex. | (a) Linear monoamine | | (b) Diamine | (c) Ether bond-containing compound | | | (d) Water concentration (% by weight) |
|---|---|---|---|---|---|---|---|
| | | | | Component | Weight ratio [(b) + (c)]/(a) | Weight ratio (c)/(b) | |
| 19 | Monoethanolamine | 2-Amino-2-methyl-1-propanol | Piperazine | Ethylene glycol monoethyl ether acetate | | | |

Test Examples 1 to 4

In Test Example 1, N-ethylaminoethanol was used as a linear monoamine (component a), 2-methylpiperazine was used as a diamine (component b), propylene glycol monopropyl ether was used as a first ether bond-containing compound ether (component c), and they were dissolved and mixed in water (component d) to obtain an absorbent.

In Test Example 2, an absorbent having the same composition as that in Test Example 1 except for using piperazine as the diamine (component b) in Test Example 1 was obtained.

In Test Example 3, an absorbent having the same composition as that in Test Example 1 except for using N-butylaminoethanol as the linear monoamine (component a) was obtained.

In Test Example 4, an absorbent having the same composition as that in Test Example 3 except for using piperazine as the diamine (component b) was obtained.

Test Examples 5 to 17

In Test Example 5, two kinds of linear monoamines (1) (component a) were used. A monoethanolamine was used as a first linear monoamine, and 2-amino-2-methyl-1-propanol was used as a second linear monoamine.

Piperazine was used as the diamine (2) (component b), and propylene glycol monopropyl ether was used as the first ether bond-containing compound ether (3) (component c). They were dissolved and mixed in water (component d) to obtain an absorbent.

In Test Example 6, an absorbent having the same composition as that in Test Example 5 except for using propanediamine as the diamine (2) (component b) in Test Example 5 was obtained.

In Test Example 7, an absorbent having the same composition as that in Test Example 5 except for using dipropylene glycol monopropyl ether as the first ether bond-containing compound ether (3) (component c) in Test Example 5 was obtained.

In Test Example 8, an absorbent having the same composition as that in Test Example 5 except that the weight ratio [(component b)+(component c)]/(component a), the addition weight ratio ((c)/(b)) of (the component c) and water (component d), and the water (component d) concentration were changed as described below in Test Example 5 was obtained.

In Test Example 9, an absorbent having the same composition as that in Test Example 5 except for using N-ethylaminoethanol as the first linear monoamine in Test Example 5 was obtained.

In Test Example 10, an absorbent having the same composition as that in Test Example 9 except for using N-butylaminoethanol as the first linear monoamine in Test Example 9 was obtained.

In Test Example 11, an absorbent having the same composition as that in Test Example 9 except for using N-methyldiethanolamine as the first linear monoamine in Test Example 9 was obtained.

In Test Example 12, an absorbent having the same composition as that in Test Example 11 except for using N-ethylaminoethanol as the second linear monoamine in Test Example 11 was obtained.

In Test Example 13, an absorbent having the same composition as that in Test Example 12 except for using N-butylaminoethanol as the second linear monoamine in Test Example 12 was obtained.

In Test Example 14, an absorbent having the same composition as that in Test Example 11 except for using N-ethyldiethanolamine as the first linear monoamine in Test Example 11 was obtained.

In Test Example 15, an absorbent having the same composition as that in Test Example 14 except for using N-ethylaminoethanol as the second linear monoamine in Test Example 14 was obtained.

In Test Example 16, an absorbent having the same composition as that in Test Example 14 except for using N-butylaminoethanol as the second linear monoamine in Test Example 14 was obtained.

In Test Example 17, an absorbent having the same composition as that in Test Example 11 except for using 4-dimethylamino-1-butanol as the first linear monoamine in Test Example 11 was obtained.

Test Examples 18 and 19

In Test Example 18, two kinds of linear monoamines (1) (component a) were used. A monoethanolamine was used as a first linear monoamine, and 2-amino-2-methyl-1-propanol was used as a second linear monoamine. Piperazine was used as the diamine (2) (component b), and ethylene glycol monomethyl ether acetate was used as the second ether bond-containing compound ether (4) (component c). They were dissolved and mixed in water (component d) to obtain an absorbent.

In Test Example 19, an absorbent having the same composition as that in Test Example 18 except for using ethylene glycol monoethyl ether acetate as the second ether bond-containing compound ether (4) (component c) in Test Example 18 was obtained.

In Test Examples 1 to 19, the total concentration of the linear monoamine (component a) and the diamine as the component (b) was set within a range of 47 to 55, by weight.

In Test Examples 1 to 4, the weight ratio of [the (component b) and the (component c)] to the (component a) was set to 0.53 to 0.94. In Test Examples 5 and 6, the weight ratio of [the (component b) and the (component c)] to the (component a) was set to 0.84. In Test Example 7, the weight ratio of [the (component b) and the (component c)] to the (component a) was set to 0.40. In Test Example 8, the weight ratio of [the (component b) and the (component c)] to the (component a) was set to 0.35 to 1.1. In Test Examples 9 to 17, the weight ratio of [the (component b) and the (component c)] to the (component a) was set to 0.61. In Test Examples 18 and 19, the weight ratio of [the (component b) and the (component c)] to the (component a) was set to 0.84.

In Test Examples 1 to 7, the addition weight ratio ((c)/(b)) of the (component c) to the diamine (component b) was set to 1.2 to 7.8. In Test Example 8, the addition weight ratio ((c)/(b)) of the (component c) to the diamine (component b) was set to 0.99 to 5.0. In Test Examples 9 to 19, the addition weight ratio ((c)/(b)) of the component c to the diamine (component b) was set to 1.2 to 7.8.

In Test Examples 1 to 7, the water (component d) concentration was 22 to 45% by weight. In Test Example 8, the water (component d) concentration was 17 to 46% by weight. In Test Examples 9 to 19, the water (component d) concentration was 22 to 45% by weight.

An absorption condition in the tests was set to 40° C. and 10 kPa $CO_2$, a regeneration condition was set to 120° C., and the reboiler duty reduction percentages (%) that were the reduction percentages relative to the reboiler duties in Comparative Examples as references were determined.

The results in Test Examples 1 to 8 are illustrated in FIG. 2, the results in Test Examples 9 to 17 are illustrated in FIG. 3, and the results in Test Examples 18 and 19 are illustrated in FIG. 4. In Test Example 8, the mixing condition was changed within the mixing range, a plurality of tests were carried out, and an average was obtained. As illustrated in FIGS. 2 to 4, all the reboiler duty reduction percentages in Test Examples 1 to 19 are higher than the references of Comparative Examples. In particular, the reboiler duty reduction percentages in Test Examples 1 to 6, 9 to 16, 18, and 19 are more than 5%, and the reboiler duty reduction percentage in Test Example 16 is more than 10%, which are good.

Therefore, the present invention can provide a composite amine absorbent having excellent saving energy as compared with a conventional composite amine absorbent since the composite amine absorbent is obtained by dissolving the linear monoamine (1) (component a), the diamine (2) (component b), and the first ether bond-containing compound (3) or the second ether bond-containing compound (4) (component c) in water (component d). Furthermore, a decrease in reboiler duty during regeneration of an absorbent in which $CO_2$ or $H_2S$, or both of $CO_2$ and $H_2S$ in a gas have been absorbed can be attained.

Test Example 20

The reboiler duty of the absorbent in Test Example 11 was compared with the reboiler duty of an absorbent having a composition in Example 1 of Patent Literature 2 (U.S. Pat. No. 4,705,673) proposed for a physical absorption method. The results are listed in [Table 2] below. Herein, in the composition in Test Example 10, two kinds of linear monoamines (1) (component a) were used, N-methyldiethanolamine was used as the first linear monoamine, 2-amino-2-methyl-1-propanol was used as the second linear monoamine, piperazine was used as the diamine (2) (component b), propylene glycol monopropyl ether was used as the first ether bond-containing compound ether (3) (component c), and they were dissolved and mixed in water (component d). The composition in Example 1 of Patent Literature 2 (U.S. Pat. No. 4,705,673) includes methyldiethanolamine (MDEA), methoxytriglycol (MTG), and water. The reboiler duty reduction percentage in [Table 2] is a reduction percentage relative to the reboiler duty of Comparative Example [an example of a condition where the concentration of water is increased by an amount corresponding to the concentration of the ether bond-containing compound (component c)] under the same condition as that in an example of performance in [Table 2] except that the ether bond-containing compound is excluded.

TABLE 2

|  | Test Example 11 | Composition liquid in Example 1 of U.S. Pat. No. 4,705,673 |
|---|---|---|
| Reboiler duty reduction percentage (%) | 6.5 | −5 |

As listed in [Table 2], in a case of the absorbent having the composition in Example 1 of Patent Literature 2 (U.S. Pat. No. 4,705,673) (methyldiethanolamine (MDEA), methoxytriglycol (MTG), water), for example, when the condition is not under a high-pressure gas near normal pressure, the reboiler duty reduction percentage is low, and the reboiler duty is deteriorated (reduction percentage: −5%) as compared with a case where an ether bond-containing compound is not added. In the present idea, a reduction in reboiler duty is attained.

Test Example 21

The solubilities in water of the first ether bond-containing compound (propylene glycol monopropyl ether) in Test Example 1, the first ether bond-containing compound (dipropylene glycol monopropyl ether) in Test Example 7, and the ether bond-containing compound of the chemical formula I wherein $R^2$ has 4 (C4) or more carbon atoms (butylene glycol monobutyl ether) were compared. The results are listed in [Table 3] below.

TABLE 3

|  | Ether bond-containing compound in Test Example 1 | | Ether bond-containing compound, of chemical formula I wherein $R^2$ has 4 or more carbon atoms Butylene glycol monobutyl ether |
|---|---|---|---|
|  | Propylene glycol monopropyl ether | Dipropylene glycol monopropyl ether | |
| Solubility in water (% by weight) | 20 or more | | About 1 |

As listed in [Table 3], the solubilities in water of the first ether bond-containing compound (propylene glycol monopropyl ether) in Test Example 1 and the first ether bond-containing compound (dipropylene glycol monopropyl ether) in Test Example 7 are 20% by weight or more. On the other hand, the solubility in water of the ether bond-containing compound of the chemical formula I wherein $R^2$ has 4 or more carbon atoms is as low as about 1% by weight. This indicates that the ether bond-containing compound of the chemical formula I wherein $R^2$ has 4 (C4) or more carbon atoms is unlikely to be used as an aqueous solution, and problems about operability and performance improvement. The solubilities in water of the ether bond-containing compounds (propylene glycol monopropyl ether and dipropylene glycol monopropyl ether) in Test Examples 1 and 7 are high, and mitigation of operability deterioration issues and a reduction in reboiler duty can be attained.

Test Example 22

The solubilities in water of the first ether bond-containing compound (propylene glycol monopropyl ether) in Test Example 1, the ether bond-containing compound (dipropylene glycol monopropyl ether) in Test Example 7, and the ether bond-containing compound of the chemical formula I wherein $R^3$ is an alkyl group (propylene glycol dibutyl ether) were compared. The results are listed in [Table 4] below.

TABLE 4

| | Ether bond-containing compound in Test Example 1 | | Ether bond-containing compound of chemical formula I wherein $R^3$ is alkyl group |
| --- | --- | --- | --- |
| | Propylene glycol monopropyl ether | Dipropylene glycol monopropyl ether | Propylene glycol dibutyl ether |
| Solubility in water (% by weight) | 20 or more | | Less than 1 |

As listed in [Table 4], the solubilities in water of the ether bond-containing compound (propylene glycol monopropyl ether) in Test Example 1 and the ether bond-containing compound (dipropylene glycol monopropyl ether) in Test Example 7 are 20% by weight or more. On the other hand, the solubility in water of the ether bond-containing compound of the chemical formula I wherein $R^3$ is an alkyl group is as low as less than 1% by weight. This indicates that the ether bond-containing compound is unlikely to be used as an aqueous solution, and problems about operation and performance enhancement arise. The solubilities in water of the ether bond-containing compounds (propylene glycol monopropyl ether and dipropylene glycol monopropyl ether) in Test Examples 1 and 7 are high, and mitigation of operability deterioration issues and a reduction in reboiler duty can be attained.

Test Example 23

The boiling points of the second ether bond-containing compound (ethylene glycol monomethyl ether acetate: 5 carbon atoms) in Test Example 18, the second ether bond-containing compound (ethylene glycol monoethyl ether acetate: 6 carbon atoms) in Test Example 19, and the ether bond-containing compound (ethylene glycol ethyl methyl ether: 5 carbon atoms, ethylene glycol diethyl ether: 6 carbon atoms) of the chemical formula II wherein $R^1$ is an alkyl group were compared. The results are listed in [Table 5] below.

TABLE 5

| | Ether bond-containing compounds in Test Examples 18 and 19 | | Ether bond-containing compound of chemical formula II wherein $R^1$ is alkyl group | |
| --- | --- | --- | --- | --- |
| | Ethylene glycol monomethyl ether acetate (5 carbon atoms) | Ethylene glycol monoethyl ether acetate (6 carbon atoms) | Ethylene glycol ethyl methyl ether (5 carbon atoms) | Ethylene glycol diethyl ether (6 carbon atoms) |
| Boiling point (° c.) | 143 | 15 6 | 100 to 102 | 12 0 |

As listed in [Table 5], the boiling point of the second ether bond-containing compound (ethylene glycol monomethyl ether acetate) in Test Example 18 is 143° C., and the boiling point of the second ether bond compound (ethylene glycol monoethyl ether acetate) in Test Example 19 is 156° C. On the other hand, the boiling points under atmospheric pressure of the ether bond-containing compounds of the chemical formula II wherein $R^1$ is an alkyl group, ethylene glycol ethyl methyl ether and ethylene glycol diethyl ether, are as low as 100 to 102° C. and 120° C., respectively. The ethylene glycol ethyl methyl ether and the ethylene glycol diethyl ether have problems about operability and performance improvement, such as release outside a system of the ether bond-containing compounds caused along with gas emissions due to vaporization. The second ether bond-containing compound (ethylene glycol monomethyl ether acetate: 5 carbon atoms) in Test Example 18 and the second ether bond-containing compound (ethylene glycol monoethyl ether acetate: 6 carbon atoms) in Test Example 19 have a higher boiling point than an ether bond-containing compound of the chemical formula II wherein $R^1$ is an alkyl group although the number of carbon atoms is the same. Mitigation of operability deterioration issues and a reduction in reboiler duty can be attained.

Specifically, when as the second ether bond-containing compound, an ether bond-containing compound having a low boiling point, like the ether bond-containing compound of the chemical formula II wherein $R^1$ is an alkyl group, is used, a problem of emission increase caused by, for example, release of the ether bond-containing compound from an absorber outside the system along with gas emissions due to vaporization arises during absorption of $CO_2$. Furthermore, the concentration of the ether bond-containing compound in an absorbent is decreased with the release outside the system, and performance improvement of $CO_2$ recovery duty (reboiler duty) cannot be attained.

REFERENCE SIGNS LIST

12 $CO_2$ recovery unit
13 Industrial combustion facility
14 Flue gas
16 Flue gas cooling device
17 $CO_2$ absorbent (lean solution)
18 $CO_2$ absorber
19 $CO_2$ absorbent containing absorbed $CO_2$ (rich solution)
20 Absorbent regenerator
21 Cleaning water

The invention claimed is:

1. A composite amine absorbent for absorbing $CO_2$ or $H_2S$, or both of $CO_2$ and $H_2S$ in a gas, the composite amine absorbent being obtained by dissolving
   a linear monoamine,
   a diamine, and
   an ether bond-containing compound of following chemical formula (I) in water:

$$R^1-O-(R^2-O)_n-R^3 \quad (I)$$

wherein $R^1$ is a hydrocarbon group having 2 to 4 carbon atoms,
   $R^2$ is a propylene group,
   $R^3$ is hydrogen, and
   n is 1 to 3.

2. The composite amine absorbent according to claim 1, wherein
   the ether bond-containing compound of the chemical formula (I) is propylene glycol alkyl ether, and
   alkyl ether in the propylene glycol alkyl ether is any of ethyl ether, propyl ether, and butyl ether.

3. A composite amine absorbent for absorbing $CO_2$ or $H_2S$, or both of $CO_2$ and $H_2S$ in a gas, the composite amine absorbent being obtained by dissolving
   a linear monoamine,
   a diamine, and
   an ether bond-containing compound of following chemical formula (II) in water:

$$R^4-O-(R^5-O)_n-R^6 \quad (II)$$

wherein $R^4$ is an acetyl group,
   $R^5$ is an ethylene group,
   $R^6$ is an alkyl group, and
   n is 1.

4. The composite amine absorbent according to claim 3, wherein
   the ether bond-containing compound of the chemical formula (II) is ethylene glycol alkyl ether acetate, and
   alkyl ether in the ethylene glycol alkyl ether acetate is any of methyl ether and ethyl ether.

5. The composite amine absorbent according to claim 1, wherein the linear monoamine includes at least one of a primary linear monoamine, a secondary linear monoamine, and a tertiary linear monoamine.

6. The composite amine absorbent according to claim 1, wherein the diamine includes at least one of a primary linear polyamine, a secondary linear polyamine, and a cyclic polyamine.

7. The composite amine absorbent according to claim 1, wherein a total concentration of the linear monoamine and the diamine is 40 to 60% by weight based on the total weight of the absorbent.

8. The composite amine absorbent according to claim 1, wherein a mixing ratio ((diamine+ether bond-containing compound)/linear monoamine) of the diamine and the ether bond-containing compound to the linear monoamine is 0.35 to 1.1.

9. The composite amine absorbent according to claim 1, wherein a weight ratio of the ether bond-containing compound to the diamine as a mixing ratio of the diamine and the ether bond-containing compound is 0.99 to 7.8.

10. The composite amine absorbent according to claim 3, wherein a mixing ratio ((diamine+ether bond-containing compound)/linear monoamine) of the diamine and the ether bond-containing compound to the linear monoamine is 0.35 to 1.1.

11. The composite amine absorbent according to claim 3, wherein a weight ratio of the ether bond-containing compound to the diamine as a mixing ratio of the diamine and the ether bond-containing compound is 0.99 to 7.8.

12. A method for removing $CO_2$ or $H_2S$, or both of $CO_2$ and $H_2S$, the method comprising:
    bringing a gas containing $CO_2$ or $H_2S$, or both of $CO_2$ and $H_2S$ into contact with an absorbent to remove $CO_2$ or $H_2S$, or both of $CO_2$ and $H_2S$ from the gas in an absorber;
    removing $CO_2$ or $H_2S$, or both of $CO_2$ and $H_2S$ from a rich solution in which the absorbent has absorbed $CO_2$ or $H_2S$, or both of $CO_2$ and $H_2S$ to obtain a lean solution in an absorbent regenerator; and
    reusing the lean solution to remove $CO_2$ or $H_2S$, or both of $CO_2$ and $H_2S$ from the gas in the absorber, wherein as the absorbent, the composite amine absorbent according to claim 1 is used.

13. The method for removing $CO_2$ or $H_2S$, or both of $CO_2$ and $H_2S$ according to claim 12, wherein a temperature in the absorber during contact of the gas with the absorbent is 30 to 80° C., and a temperature for obtaining the lean solution in the absorbent regenerator is 110° C. or higher.

14. The method for removing $CO_2$ or $H_2S$, or both of $CO_2$ and $H_2S$ according to claim 12, wherein a $CO_2$ partial pressure at an inlet of the absorber is a low partial pressure of 0.003 to 0.1 MPa.

15. The composite amine absorbent according to claim 3, wherein the linear monoamine includes at least one of a primary linear monoamine, a secondary linear monoamine, and a tertiary linear monoamine.

16. The composite amine absorbent according to claim 3, wherein the diamine includes at least one of a primary linear polyamine, a secondary linear polyamine, and a cyclic polyamine.

17. The composite amine absorbent according to claim 3, wherein a total concentration of the linear monoamine and the diamine is 40 to 60% by weight based on the total weight of the absorbent.

18. A method for removing $CO_2$ or $H_2S$, or both of $CO_2$ and $H_2S$, the method comprising:
    bringing a gas containing $CO_2$ or $H_2S$, or both of $CO_2$ and $H_2S$ into contact with an absorbent to remove $CO_2$ or $H_2S$, or both of $CO_2$ and $H_2S$ from the gas in an absorber;
    removing $CO_2$ or $H_2S$, or both of $CO_2$ and $H_2S$ from a rich solution in which the absorbent has absorbed $CO_2$ or $H_2S$, or both of $CO_2$ and $H_2S$ to obtain a lean solution in an absorbent regenerator; and
    reusing the lean solution to remove $CO_2$ or $H_2S$, or both of $CO_2$ and $H_2S$ from the gas in the absorber, wherein as the absorbent, the composite amine absorbent according to claim 3 is used.

19. The method for removing $CO_2$ or $H_2S$, or both of $CO_2$ and $H_2S$ according to claim 18, wherein a temperature in the absorber during contact of the gas with the absorbent is 30 to 80° C., and a temperature for obtaining the lean solution in the absorbent regenerator is 110° C. or higher.

20. The method for removing $CO_2$ or $H_2S$, or both of $CO_2$ and $H_2S$ according to claim 18, wherein a $CO_2$ partial pressure at an inlet of the absorber is a low partial pressure of 0.003 to 0.1 MPa.

* * * * *